March 30, 1954 R. W. RODERICK 2,673,485

FILM SYNCHRONIZATION AND IDENTIFICATION MARKING SYSTEM

Filed July 27, 1951

2 Sheets-Sheet 1

INVENTOR.
Robert W. Roderick
BY Morris Rakin
ATTORNEY.

March 30, 1954 R. W. RODERICK 2,673,485

FILM SYNCHRONIZATION AND IDENTIFICATION MARKING SYSTEM

Filed July 27, 1951

2 Sheets-Sheet 2

INVENTOR.
Robert W. Roderick
BY Morris L. Rabat[?]
ATTORNEY.

Patented Mar. 30, 1954

2,673,485

UNITED STATES PATENT OFFICE 2,673,485

FILM SYNCHRONIZATION AND IDENTIFICATION MARKING SYSTEM

Robert W. Roderick, North Hollywood, Calif., assignor to Radio Corporation of America, a corporation of Delaware Application July 27, 1951, Serial No. 238,962

8 Claims. (Cl. 88—16.2)

This invention relates to synchronizing systems, and particularly to a system for providing synchronization marks on a picture film and a sound film simultaneously, the marks serving to identify any one particular camera of several cameras photographing a scene.

Systems for simultaneously marking a picture film and a film on which concomitant sound is recorded are well-known, one such system shown in Robinson U. S. Patent No. 1,771,940 of July 29, 1930. Also, systems for marking a sound film to identify one of a plurality of cameras photographing a certain scene are known, such a system being disclosed in Owens U. S. Patent No. 1,950,091 of March 6, 1934. The present invention is directed to a system of the general type shown in the Owens patent, but which utilizes a commutating system for providing synchronization and camera identification marks on both the camera and sound films. For instance, a slow speed motor drives a conducting slip ring segment for a predetermined time to automatically permit the cameras and recorder to reach the same uniform speed and then to automatically apply synchronization and identification marks to both the camera and sound films. When the marks are originally applied to a magnetic sound record, a system is provided for applying the synchronization and identifying marks to a photographic film during rerecording.

The principal object of the invention, therefore, is to facilitate the synchronization of picture and sound films.

Another object of the invention is to facilitate the placing of synchronization and identification marks on both picture films and a sound film.

A further object of the invention is to provide an improved system for providing synchronization and identification marks on one or more camera films and a sound film.

A still further object of the invention is to provide an automatic system of identifying a picture film with respect to a certain camera and a sound film.

Figure 1:
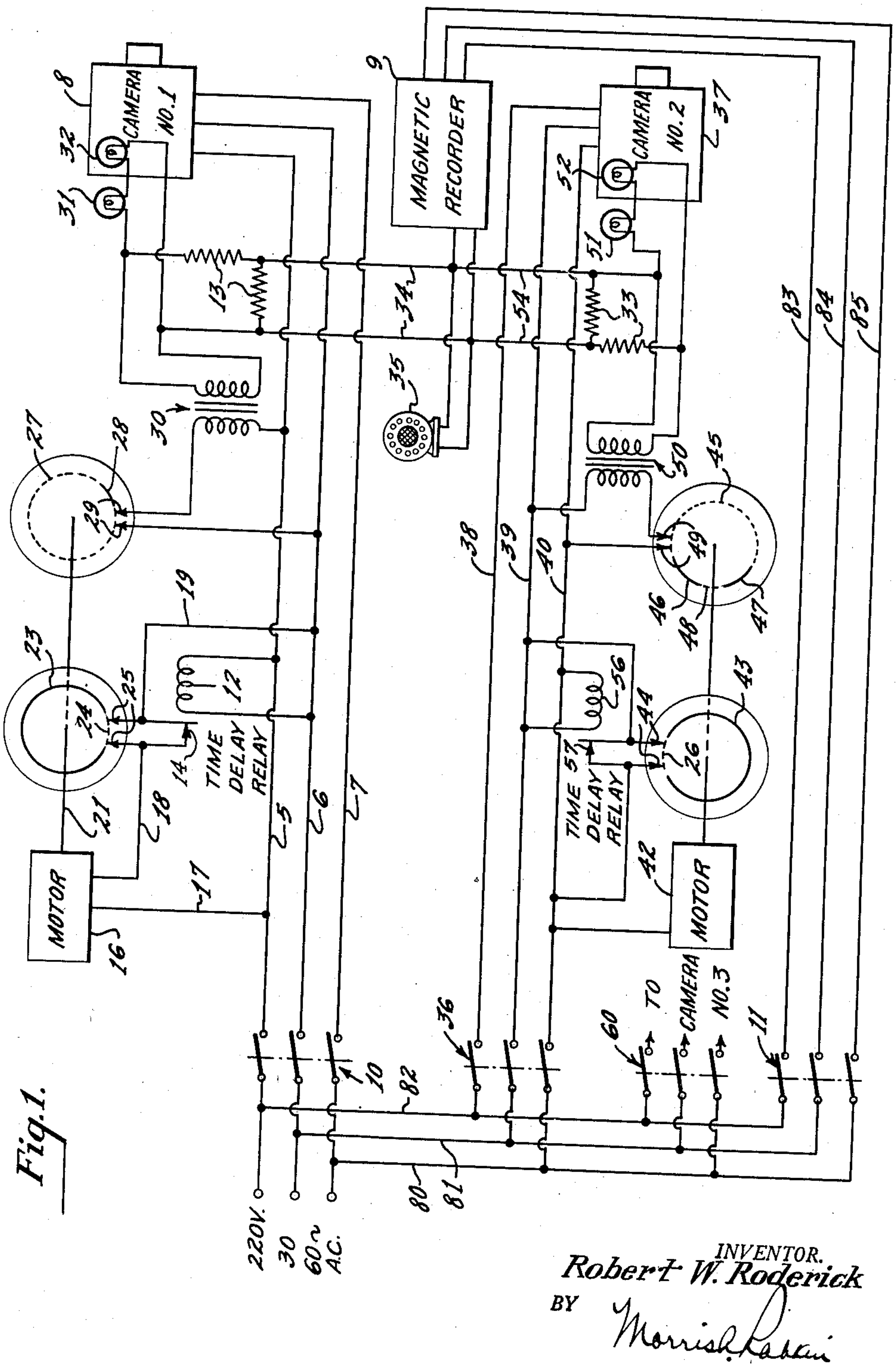
Figure 2:
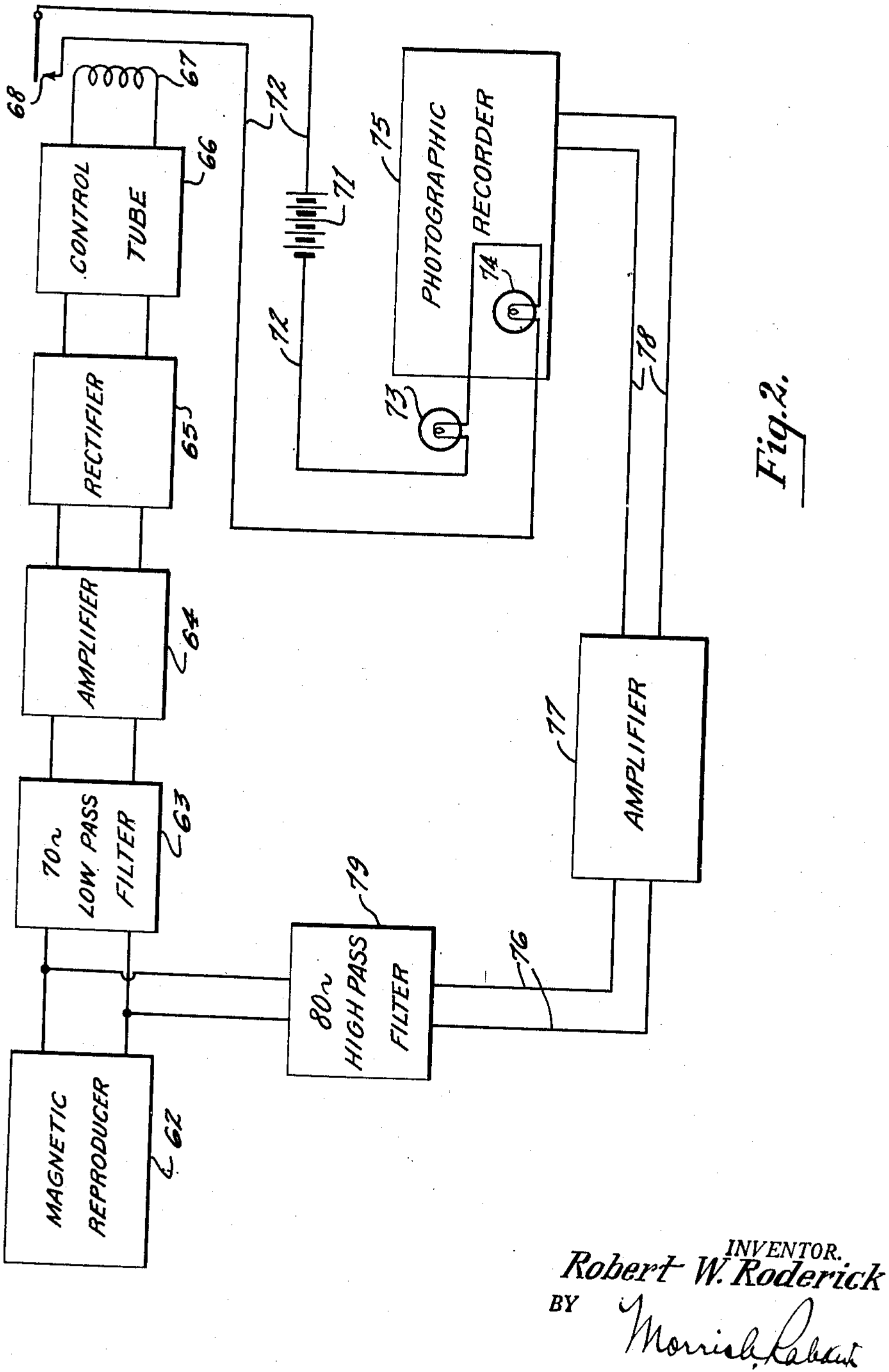

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a combination diagrammatic and schematic drawing of the recording system, and Fig. 2 is a diagrammatic drawing of a rerecording system for transferring the marks on a magnetic sound track to a photographic sound track.

Referring now to Fig. 1, a standard source of three-phase power is applied over conductors 5, 6, and 7 to a camera 8 when a switch 10 is closed. Over conductors 80 to 85, inclusive, power is applied to a magnetic recorder 9 when switch 11 is closed. The closing of switch 10 also applies power from one phase of conductors 5, 6, and 7 to the winding of a time delay relay 12 having a contact 14. Also simultaneously, power is applied from conductors 5 and 6 to a motor 16 over conductors 17, 18, and 19 across contact 14 to drive a commutating device. The motor 16 may be geared so that its shaft 21 rotates at the proper speed, such as one revolution per minute.

On the shaft 21 of motor 16, is a rotatable disc or slip ring having a conducting segment 23 and a non-conducting segment 24, shown by the solid and dotted lines, respectively. A pair of brushes 25 are adapted to be shorted when the segment 23 is in contact with both brushes. Also rotated by shaft 21 is a rotatable disc having a short conducting segment 28 and a non-conducting segment 27 shown by the solid and dotted lines, respectively. Current will pass between brushes 29 when the conducting segment 28 is in contact with both brushes.

The brushes 29 are connected to one phase of the three-phase power supply over the primary of a transformer 30. The secondary of transformer 30 is connected in series with a pilot lamp 31 external of the camera 8 and a marking lamp 32 for light impressing the picture film in camera 8. Connected in parallel across the secondary of transformer 30 is an "L" pad 13, which is connected by conductors 34 to the recording head in the magnetic recorder 9. A microphone 35 feeds the recording head in the recorder 9.

The operation of the portion of the circuit of Fig. 1 just described will now be explained. Upon the closing of switches 10 and 11, the synchronous driving motor of camera No. 1 and the synchronous driving motor in recorder 9 are both energized over their respective conductors. Simultaneously, the motor 16 is energized over normally closed contact 14. The motor 16 rotates the two discs which brings the conducting portion 23 in contact with brushes 25 before the time delay relay 12 is actuated to break its contact 14. Thus, the motor 16 will continue to operate after contact 14 is broken and until non-conducting segment 24 reaches the brushes 25. As the camera 8 and recorder 9 accelerate to uniform speed, the segment 28 approaches the brushes 29 and when uniform film speed is reached, the brushes 29 are short-circuited by segment 28 and a sixty cycle tone will be impressed over transformer 30 on the pilot lamp 31 and the camera film blooping or marking lamp 32. Simultaneously, the sixty cycle tone will be impressed on the recording head of the magnetic recorder 9 over conductors 34. The conducting segment 28 is positioned with respect to the non-conducting segment 24 so that as soon as a mark has been applied, the brushes 25 are open-circuited, which will stop motor 16. This operation places a single mark on the film in the camera and a single mark on the sound film in the magnetic recorder 9.

The remaining portion of the system shown in Fig. 1 is similar to the portion just described. The closing of a three-pole switch 35 applies power to a camera 37 over conductors 38, 39, and 40. A motor 42, similar to motor 16, rotates a conducting segment 43, similar to segment 23, to contact brushes 44, similar to brushes 25. A non-conducting segment 26 is provided between the ends of segment 43. A disc having two conducting segments 46 and 47 and non-conducting sections 45 and 48 is also driven by motor 42. The segments 46 and 47 are adapted to short-circuit brushes 49, thus energizing a transformer 50 with sixty cycle power from one phase of the three-phase source. Thus, a pilot lamp 51 and a blooping or marking lamp 52 in camera No. 2 are energized. Simultaneously, over "L" pad 33 and conductors 54, the recording head in magnetic recorder 9 is actuated.

The portion of the system of Fig. 1 just described functions in the same manner as the portion previously described. However, synchronization and identification marks are now applied to the film in camera No. 2 and to the film in magnetic recorder 9 to provide both synchronization marks for both films and to identify camera No. 2 by having two marks made in series both on the picture film and sound film. Time delay relay 56 functions in the same manner as time relay 12; that is, the contacts 57 are opened only after the brushes 44 are short-circuited to apply power to motor 42. As soon as the two synchronization and identification marks are applied to both films by segments 46 and 47, shorting brushes 49, the non-conducting segment 26 arrives at brushes 44 to stop motor 42. Since camera No. 2 may be started before camera No. 1 is stopped or is still photographing, the "L" pad 13 prevents the sixty cycle tone from lighting lamps 31 and 32 while still applying the tone to the magnetic sound film. Pad 33 serves the same purpose when camera No. 1 is started after camera No. 2.

A third switch 60 is shown, which may control the starting of a camera No. 3 and another motor and commutator, not shown, corresponding to the motors 16 and 42 just described. However, the third motor would rotate a disc having three conducting segments instead of the one shown at 28 or the two shown at 46 and 47, so that three successive signals will be applied to both the picture and sound films to indicate camera No. 3. For more cameras, additional conducting segments may be provided.

From the above description, it will be realized that upon the closing of either of switches 10, 36, or 60, synchronization or start marks will be applied to the films in a respective camera and the film in the magnetic recorder, the marks applied also identifying the camera or cameras photographing the scene at any particular time.

Referring now to Fig. 2, a system for transferring the magnetic synchronization marks to a photographic sound track is illustrated. In this system, a magnetic reproducer 62 feeds a seventy cycle low-pass filter 63, the output of which is amplified in amplifier 64 and rectified in a rectifier 65. The output of the rectifier is fed to a control tube 66 which may be of the nature of a thyratron. That is, the tube 66 may be normally biased to cut off, plate current flowing through a relay winding 67 when the rectified current is impressed thereon.

When the relay winding 67 is energized, it closes its contact 68 and energy from an electrical source, such as a battery 71, is fed over conductors 72 to a pilot lamp 73 and a blooping or marking lamp 74 in a photographic recorder 75. Thus, as the sixty cycle signals are reproduced in the reproducer 62, they will energize lamps 73 and 74 to impress on the photographic sound film corresponding marks in the form of light images. The regular reproduced signal will be prevented from actuating the lamps 73 and 74 by the seventy cycle low-pass filter. The concomitant sound signal will be impressed on an eighty cycle high-pass filter 79 and then on conductors 76, amplifier 77, and conductors 78 to the modulator in the photographic recorder 75. By using filter 79, the marking signals are eliminated from the photographic sound track in the event a second or third camera is started during the operation of another camera. The synchronization and identification signals, however, are applied to the photographic sound film, but not in the sound track area.

The recording and rerecording systems above described function automatically. The recording systems marks both picture and sound films upon the energization of each camera, which provides the necessary synchronization or start marks to permit the proper combination of the films at a later time, and to identify a particular camera or cameras photographing the scene on both picture and sound films. The rerecording system transfers the marks on a magnetic sound film to a photographic film, which marks may be used to enable both photographic picture and sound films to be combined into a composite print.

I claim:

1. A system for providing synchronization marks on picture and sound films and for marking said films to identify said films, comprising a camera having a picture film therein, a sound recorder having a sound film therein, means for advancing said films in said camera and recorder, energizing means for said film advancing means, a commutating device including a motor energized by said energizing means, said device including a ring having a conducting section and a non-conducting section and a second ring having a conducting section and a non-conducting section, a circuit for initially energizing said motor of said commutating device, said circuit including a time delay relay for breaking said circuit after a predetermined time period, a second circuit for energizing said motor connected through said conducting section of said first mentioned conducting ring, said second circuit supplying power to said motor after said time delay relay has disconnected said first mentioned circuit from said motor, and a third circuit for applying energy from said energizing means through the conducting section of said second mentioned ring for exposing the film in said camera and marking the film in said recorder.

2. A film marking and identification system, comprising a power supply, a plurality of picture cameras, a sound recorder, switches for connecting said power supply to said cameras and sound recorder for advancing respective picture films in said cameras and a sound film in said recorder, film marking means in each of said cameras and said recorder, a circuit for connecting said power supply to said film marking means for a predetermined time interval, a motor for controlling said circuit, and a second circuit for controlling the time said motor is connected to said power supply, said first mentioned circuit including a conducting segment rotatable by said motor and said second circuit including a conducting segment rotatable by said motor, said last mentioned segment being of a length and rotatable at a speed such that said motor is energized until said films reach uniform speed and said first mentioned segment closes said first mentioned circuit, said second mentioned circuit including a pair of normally closed contacts and a time delay relay for opening said contacts when said second mentioned segment has closed said second mentioned circuit.

3. A film marking system for automatically applying marks to films in a plurality of picture cameras and a film in a sound recorder, comprising separate means in each camera and in said recorder for advancing films at a uniform speed, a power supply, a switch for connecting each of said film advancing means in each of said cameras to said power supply, a commutating device for each camera, said device including a plurality of conducting elements and a motor for rotating said elements, said motor being energized simultaneously with the connection of a respective camera film advancing means to said power supply, a circuit through one of said conducting elements for maintaining said motor connected to said power supply during a predetermined time interval, film marking means in each of said cameras and in said recorder, and a second circuit through other of said conducting elements for connecting said power supply to respective film marking means in one camera and in said sound recorder for marking the film in said sound recorder the same as the film in said camera connected to said power supply.

4. A film marking system in accordance with claim 3, in which the number of conducting elements in each of said commutating devices is different to provide identification marks on each of said camera films and simultaneously on said sound film.

5. A system for marking a plurality of films comprising a picture film and a sound film, a first motor for advancing said picture film, a second motor for advancing said sound film, a lamp, means for energizing said motors, said energizing means supplying energy for said lamp for exposing said picture film and a signal for simultaneously recording on said sound film, a commutating device, said commutating device including a plurality of rotatable conducting and non-conducting segments, a third motor for rotating said segments, said third motor being energized simultaneously with the energization of one of said first mentioned motors, and a plurality of fixed contacts associated with said segments, one position of certain of said segments with respect to certain of said fixed contacts maintaining said third motor energized for a predetermined time period, and another position of certain other of said segments and certain other of said contacts connecting said energizing means to said lamp and for producing said signal.

6. A system for marking a plurality of films in accordance with claim 5, in which said system includes a time delay relay connected in series with said energizing means and said third motor in parallel with said commutating device for connecting said third motor to said energizing means a predetermined time period before the connecting of said third motor by said commutating device to said energizing means.

7. A system for marking picture and sound films to provide start marks thereon and marks thereon for identifying the camera in which picture film has been exposed comprising a camera, a lamp in said camera for exposing said picture film therein, a sound recorder, a sound signal modulator in said recorder for marking said sound film therein, means in said camera and in said recorder for simultaneously advancing said films, means for applying energy to said lamp and to said recorder modulator simultaneously, a commutating device, a motor for rotating said commutating device, a power source, a control circuit for connecting said motor to said power source to rotate said commutating device, said circuit connecting said motor to said source for a predetermined time period comparable to the time period required for said films to be accelerated by said advancing means to uniform speed, and means in said commutating device for connecting said power source to said camera film exposing means and said recorder modulator, said control circuit de-energizing said commutating device motor immediately after said film exposing means and said recording modulator have been actuated.

8. A system in accordance with claim 7, in which said commutating device control circuit includes a rotatable conducting segment for connecting said power source to said motor of said commutating device for said predetermined time period, a second conducting segment for connecting said power source to said film exposing means and said recorder modulator for a predetermined time period, and time delay means connected in series with said power source and said commutating device motor and in parallel with said commutating device for connecting said commutating device motor to said power source before the connecting of said motor to said power source by said commutating device.

ROBERT W. RODERICK.

References Cited in the file of this patent

UNITED STATES PATENTS

| Number | Name | Date |
|---|---|---|
| 1,950,091 | Owens | Mar. 6, 1934 |
| 2,379,505 | Watson | July 3, 1945 |